(12) United States Patent
Satchell, Jr. et al.

(10) Patent No.: US 6,908,601 B2
(45) Date of Patent: Jun. 21, 2005

(54) METHOD FOR THE PRODUCTION OF NITROGEN TRIFLUORIDE

(75) Inventors: Donald Prentice Satchell, Jr., Berkeley Heights, NJ (US); Vasu R. Mohan, Flemington, NJ (US)

(73) Assignee: The BOC Group, Inc., New Providence, NJ (US)

( * ) Notice: Subject to any disclaimer, the term of this patent is extended or adjusted under 35 U.S.C. 154(b) by 422 days.

(21) Appl. No.: 10/071,114

(22) Filed: Feb. 8, 2002

(65) Prior Publication Data

US 2003/0152507 A1 Aug. 14, 2003

(51) Int. Cl.[7] ............................................. C01B 21/06
(52) U.S. Cl. ........................................................ 423/406
(58) Field of Search .......................................... 423/406

(56) References Cited

U.S. PATENT DOCUMENTS

| | | |
|---|---|---|
| 4,001,380 A | 1/1977 | Gordon et al. |
| 4,091,081 A | 5/1978 | Woytek et al. |
| 4,543,242 A | 9/1985 | Aramaki et al. |
| 4,804,447 A | 2/1989 | Sartori |
| 4,933,158 A | 6/1990 | Aritsuka et al. |
| 5,084,156 A | 1/1992 | Iwanaga et al. |
| 5,085,752 A | 2/1992 | Iwanaga et al. |
| 5,628,894 A | 5/1997 | Tarancon |
| 5,637,285 A | 6/1997 | Coronell et al. |
| 6,010,605 A | 1/2000 | Tarancon |
| 2003/0017098 A1 * | 1/2003 | Ohno et al. |

FOREIGN PATENT DOCUMENTS

DE 198 36 807 A1 2/2000

OTHER PUBLICATIONS

Robert H. Perry and Cecil H. Chilton, Chemical Engineers' Handbook, Fifth Ed., 1969, McGraw–Hill Book Company, "Flow in Pipes and Channels", 5–29, no month.

Walter J. Moore, Physical Chemistry, Third Ed., Prentice–Hall, Inc., 1962, Chapter 3, pp. 70–72, no month.

D. Filliaudeau and G. Picard, "Temperature Dependence of the Vapor Pressures and Electrochemical Windows of the $NH_4HF_2$–HF Mixtures," Materials Science Forum, vol. 73–75 (1991) pp. 669–675, no month.

European Search Report for Application No. EP 03 25 0729 dated Mar. 9, 2004.

Patent Abstracts of Japan vol. 017, No. 452 (C–1099), Aug. 19, 1993 & JP 05 105411 A (Onoda Cement Co Ltd), Apr. 27, 1993 *abstract*.

* cited by examiner

*Primary Examiner*—Wayne A. Langel
(74) *Attorney, Agent, or Firm*—Philip H. Von Neida; Ira Lee Zebrak

(57) ABSTRACT

The invention provides a method and apparatus for producing nitrogen trifluoride. The invention involves passing a working fluid through a heat engine cycle and using the mechanical energy generated by the working fluid to produce sufficient mixing intensity within a nitrogen trifluoride reactor. The method utilizes a working fluid vapor jet, such as a hydrogen fluoride vapor jet, to impart sufficient energy to the mixing zone of a reactor in order to disperse gaseous fluorine within a liquid ammonium acid fluoride melt. A gaseous reaction product stream is removed from the reactor, the reaction product stream comprising nitrogen trifluoride and a working fluid vapor. The working fluid is then separated from the nitrogen trifluoride and recycled for reuse in the process, thereby completing a heat engine cycle.

24 Claims, 3 Drawing Sheets

Qualitative pressure-volume plot for interlocking HF-$NH_4F(HF)_x$ power cycle used to internally generate mechanical energy for mixing $F_2$ and $NH_4F(HF)_x$ for the production of $NF_3$

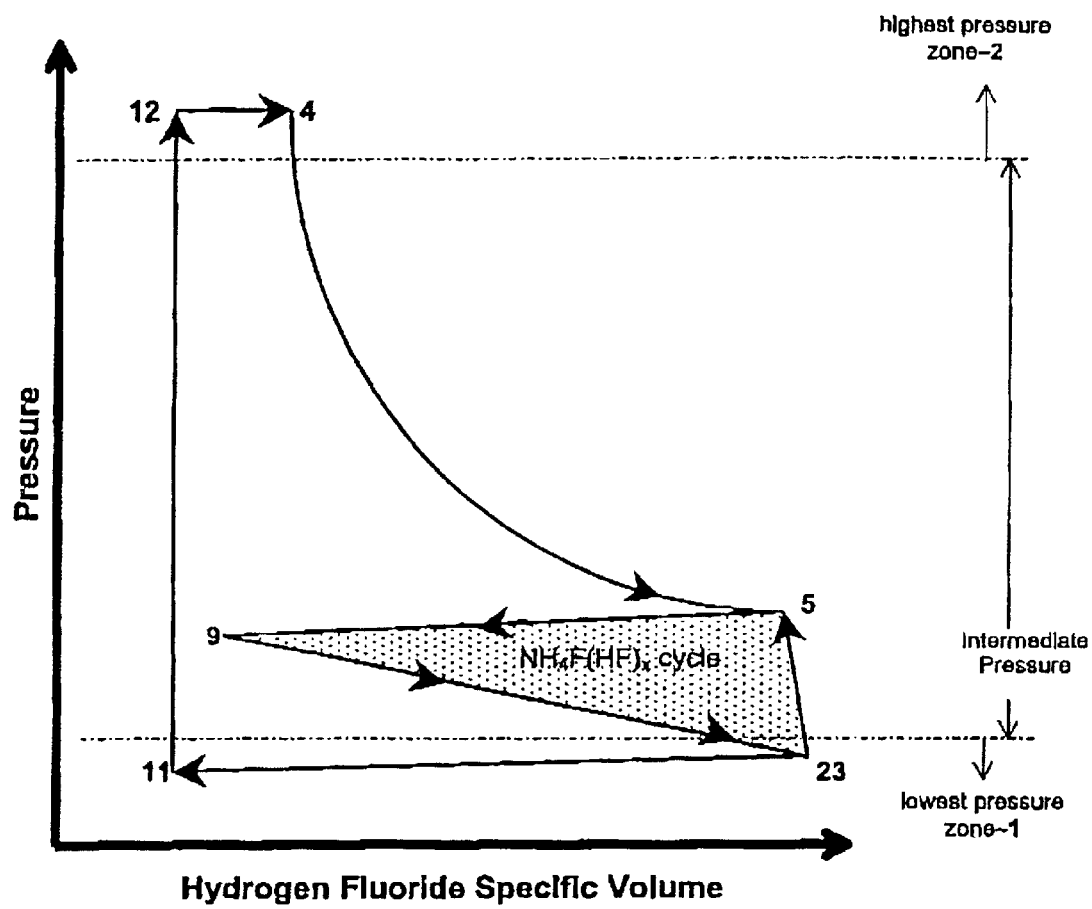
Figure 1. Qualitative pressure-volume plot for interlocking HF-NH$_4$F(HF)$_x$ power cycle used to internally generate mechanical energy for mixing F$_2$ and NH$_4$F(HF)$_x$ for the production of NF$_3$

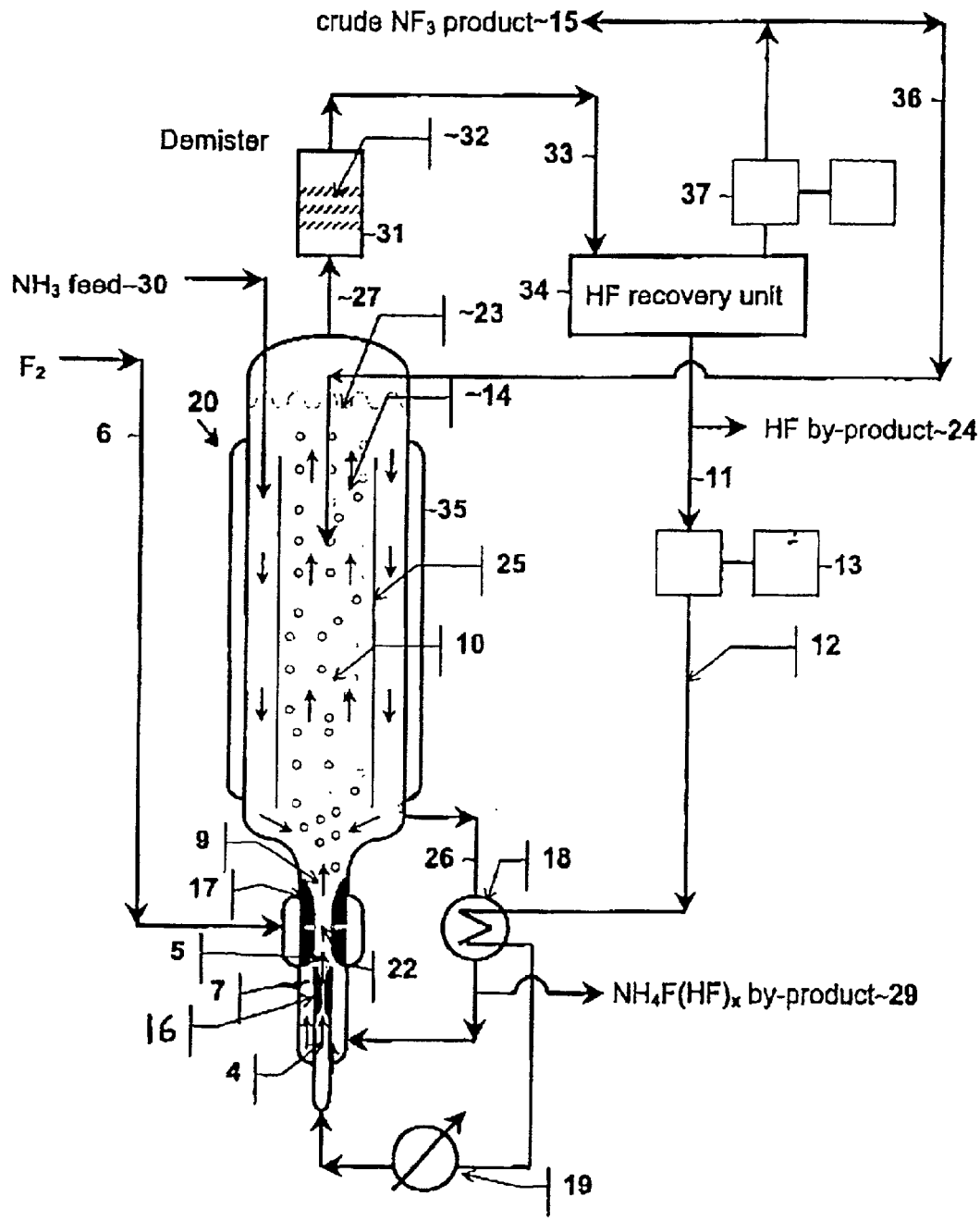
Figure 2. Up-flow reactor using power cycle illustrated on Figure 1 for the production of NF₃

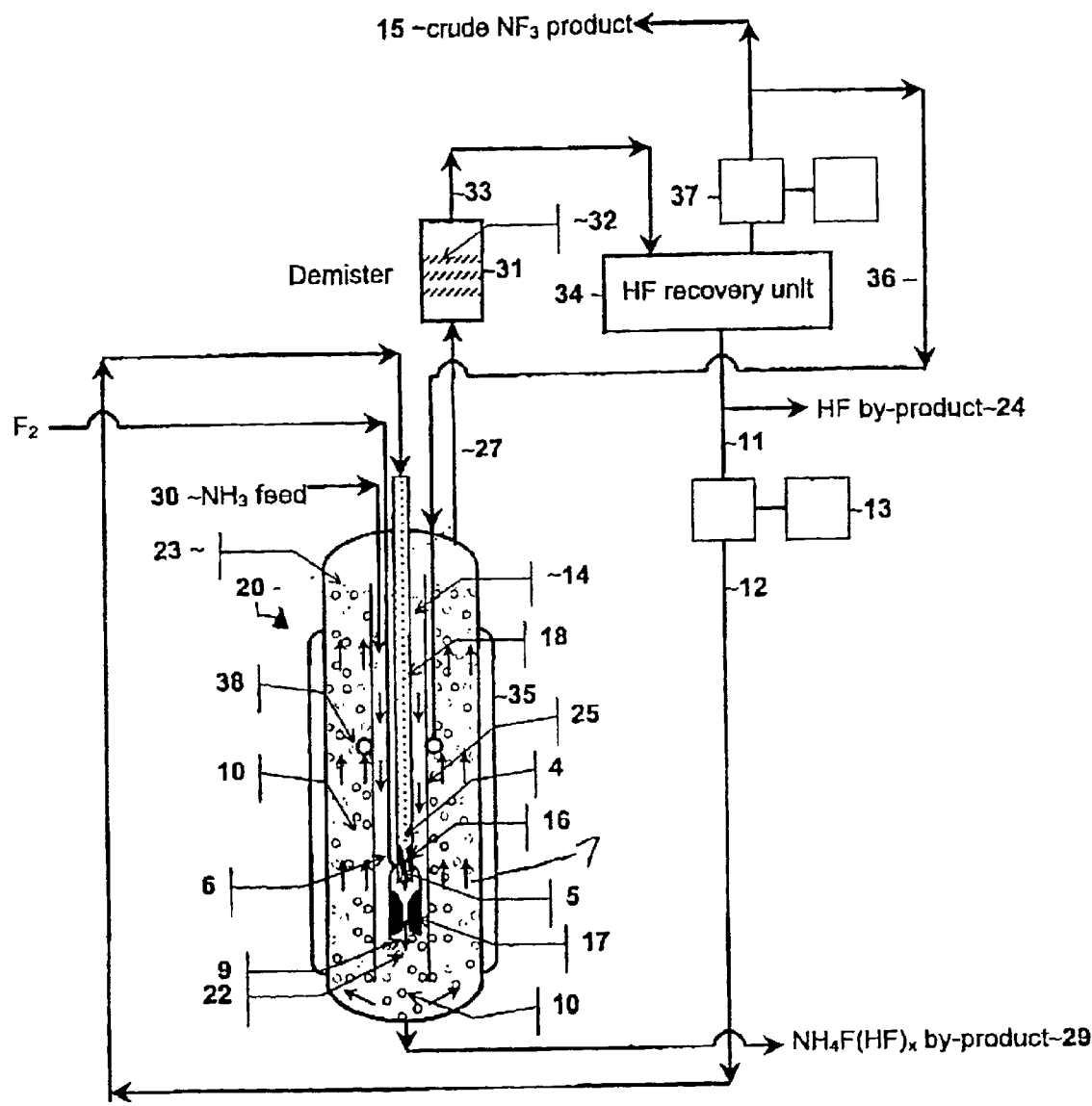
Figure 3. Down-flow reactor using power cycle illustrated on Figure 1 for the production of $NF_3$

METHOD FOR THE PRODUCTION OF NITROGEN TRIFLUORIDE

FIELD OF THE INVENTION

The present invention is directed to a process and apparatus for the production of nitrogen trifluoride from ammonia and elemental fluorine using an ammonium acid fluoride melt intermediate.

BACKGROUND OF THE INVENTION

The gas phase reaction of ammonia and gaseous elemental fluorine can produce nitrogen trifluoride. Reaction 1 illustrates the desired gas phase NF$_3$ production reaction.

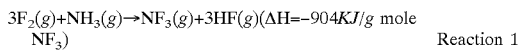
$$3F_2(g) + NH_3(g) \rightarrow NF_3(g) + 3HF(g) (\Delta H = -904 KJ/g \text{ mole } NF_3)$$ Reaction 1 wherein (g) denotes the gas phase. A solid catalyst is often used to lower the required operating temperature, which increases the NF$_3$ yield. However, it is very difficult to control the reactor temperature due to the highly exothermic nature of Reaction 1. As a result, the gas phase ammonia and fluorine reaction produces substantial quantities of HF, N$_2$, N$_2$F$_2$, and NH$_4$F, with NF$_3$ yields typically substantially less than ten percent. U.S. Pat. No. 4,091,081 teaches a process that produces much higher nitrogen trifluoride [NF$_3$] yields (approaching 60%) by contacting a molten ammonium acid fluoride [NH$_4$F(HF)x] with gaseous fluorine [F$_2$] and ammonia [NH$_3$]. U.S. Pat. No. 5,637,285 to Coronell et al. describes a similar process, wherein the F$_2$-to-NF$_3$ conversion is further increased to greater than ninety percent by imputing a large amount of mechanical energy for mixing the reactants and by using an ammonium acid fluoride melt having a HF/NH$_3$ molar ratio greater than 2.55. The Coronell patent teaches that improved NF$_3$ yields are achieved with mechanical energy inputs greater than 1,000 watts per cubic meter, preferably at or above 5,000 watts per cubic meter, most preferably at or above 35,000 watts per cubic meter. The Coronell patent utilizes a stirrer or turbine, such as a flat blade turbine, to input the mechanical energy.

However, inputting such large amounts of power using a stirrer or turbine poses reactor reliability problems. Typically, the mixing turbines that are used in this type of application are constructed of a metal, such as monel or nickel, coated with a metal fluoride passivating layer. The passivating layer is typically applied by contacting the metal turbine with a fluorine rich atmosphere. The passivating layer significantly reduces oxidation of the turbine substrate. However, the high power inputs suggested by the Coronell patent produce high sheer rates that can remove the passivating layer and expose the underlying turbine substrate to fluorine, thereby accelerating the rate of corrosion, particularly at the tip of the mixing impeller. In turn, the corrosion leads to excessive mixer shaft vibration and premature mixer shaft seal failure. Even if very diligent maintenance procedures essentially eliminate shaft vibration, the combination of a high-speed rotating seal and a corrosive fluorine and hydrogen fluoride atmosphere can lead to reliability problems. In addition, high mechanical energy input into a reactor, via a flat bladed turbine, can lead to a highly back-mixed reaction volume with essentially uniform operating conditions. In this case, there is no opportunity to optimize the local reactor operating conditions. Therefore, there remains a need in the art for a method and apparatus to efficiently and reliably contact gaseous fluorine with NH$_4$F(HF)$_x$ solution to produce nitrogen trifluoride.

SUMMARY OF THE INVENTION

The present invention combines a heat engine cycle with an NF$_3$ reactor to eliminate or greatly reduce the need for mechanical energy inputs derived from stirrers or turbines, without sacrificing high F$_2$-to-NF$_3$ conversion rates. The present invention utilizes a working fluid, such as hydrogen fluoride, in the form of a vapor jet to impart kinetic energy to a mixing zone of a NF$_3$ reactor, thereby intimately contacting a fluorine reactant with an ammonium acid fluoride melt in order to achieve a high F$_2$-to-NF$_3$ conversion rate. The working fluid may then be separated from the gaseous NF$_3$ product and recycled for continuous use in the heat engine cycle. In contrast to prior art processes, the present invention provides an NF$_3$ reactor that adequately mixes the reactants without the need for high mechanical energy inputs from a stirrer or turbine. Thus, the present invention avoids many of the corrosion problems associated with systems utilizing mechanical mixing devices.

In one aspect, the present invention provides a method for producing nitrogen trifluoride. The method includes providing a reactor comprising a mixing zone and a reaction zone in fluid communication with the mixing zone. The two reactants used for nitrogen trifluoride production, gaseous fluorine and liquid ammonium acid fluoride, are fed into the mixing zone of the reactor. A working fluid vapor jet, such as a hydrogen fluoride vapor jet, is also fed into the mixing zone of the reactor. The working fluid vapor jet transfers kinetic energy into the mixing zone, the kinetic energy dispersing the gaseous fluorine within the liquid ammonium acid fluoride. The liquid ammonium acid fluoride and the fluorine dispersed therein react to produce nitrogen trifluoride as the reactant mixture passes through the reaction zone of the reactor. A gaseous reaction product stream is removed from the reactor, the reaction product stream comprising nitrogen trifluoride and the working fluid vapor.

The gaseous product stream may then be separated into a gaseous nitrogen trifluoride product stream and a liquid working fluid stream. The working fluid stream is then recycled for reuse as the working fluid vapor jet. For example, the liquid working fluid stream may be pressurized to a pressure of about 250 to about 1600 kPa and then vaporized to form a working fluid vapor. Thereafter, the working fluid vapor may be passed through a nozzle to again form the working fluid vapor jet. In this manner, the working fluid travels through a complete heat engine cycle and provides an efficient method for generating mixing intensity in the nitrogen trifluoride reactor.

In another aspect, the present invention provides an apparatus for producing nitrogen trifluoride. The apparatus includes a reactor comprising a mixing zone and a reaction zone in fluid communication with the mixing zone. The reactor further comprises a product outlet. The apparatus includes both a gaseous fluorine feed supply and a liquid ammonium acid fluoride feed supply in fluid connection with the mixing zone of the reactor. In addition, a working fluid vapor supply is in fluid connection with the mixing zone of the reactor. A least one nozzle is operatively positioned in fluid connection with the working fluid vapor supply upstream of the mixing zone of the reactor such that the working fluid vapor passes through the nozzle, thereby forming a vapor jet. The apparatus may further comprise a separator in fluid connection or communication with the product outlet of the reactor. The separator is operatively positioned to separate a liquid working fluid stream from a gaseous nitrogen trifluoride stream. The working fluid vapor supply may comprise a liquid working fluid supply and a heat exchanger in fluid communication with the liquid working fluid supply. The heat exchanger should be capable of transferring sufficient heat energy to vaporize the liquid working fluid, thus forming a working fluid vapor. In one embodiment, the heat exchanger utilizes the heat of reaction generated in the nitrogen trifluoride reactor as the heat source for vaporizing the liquid working fluid. For example, the heat exchanger may be positioned within the reactor itself.

BRIEF DESCRIPTION OF THE DRAWINGS

Having thus described the invention in general terms, reference will now be made to the accompanying drawing, which is not necessarily drawn to scale, and wherein:

FIG. 1 is qualitative pressure-volume plot for the interlocking HF and $NH_4F(HF)_x$ heat engine cycle used to internally generate mechanical energy to mix the $F_2$ and $NH_4F(HF)_x$ melt reactants for $NF_3$ production;

FIG. 2 illustrates an up-flow reactor configuration that uses the power cycle illustrated in FIG. 1 to produce $NF_3$; and FIG. 3 illustrates a down-flow reactor configuration that uses the power cycle illustrated in FIG. 1 to produce $NF_3$.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the term "ammonium acid fluoride" includes all ammonium poly(hydrogen fluoride) complexes and ammonium fluorometallate poly(hydrogen fluoride) complexes. The ammonium acid fluoride compositions can be generically described by the acid-base stoichiometry of $NH_4M_yF_z(HF)_x$, wherein M is a metal selected from the group consisting of Group IA through VA, Group IB through VIIB and Group VIII of the Periodic Table of Elements or mixtures thereof; y is typically 0–12; z is typically 1–12 and is chosen to maintain the charge neutrality of the complex; and x is the melt acidity value. In a preferred embodiment, y approaches 0 and z approaches unity, thus yielding a complex with an acid-base stoichiometry of $NH_4F(HF)_x$. However, other ammonium acid fluoride complexes may be used without departing from the present invention.

A simplified description of the $NF_3$ production process chemistry involved in the present invention is given below. The ammonium acid fluoride melt intermediate, $NH_4F(HF)_x$, wherein x is the melt acidity value, is typically formed by the reaction of gaseous ammonia with either gaseous HF via Reaction 2 below or $NH_4F(HF)_x$ melt via Reaction 3 below.

$NH_3(g)+(1+x)HF(g) \rightarrow NH_4F(HF)_x(\lambda)$  Reaction 2

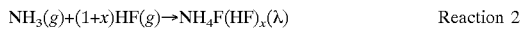  Reaction 3 wherein $(\lambda)$ denotes a species in the liquid phase.

The ammonium acid fluoride intermediate product from either Reaction 2 or 3 can react with a gaseous fluorine feed to produce the desired nitrogen trifluoride product via Reaction 4 below.

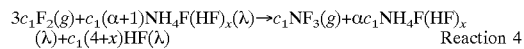  Reaction 4 wherein $c_1$ is the fraction of the $F_2$ feed that reacts to produce $NF_3$ and $\alpha$ is the ratio of the $NH_4F(HF)_x$ that is in contact with the $F_2$ feed from mass and heat transfer viewpoints to the stoichiometric requirement. Optimum reactor performance requires high effective values of $\alpha$ and x to control the $NH_4F(HF)_x(\lambda)$ temperature in contact with the fluorine gas bubbles in the reactor and ammonia vaporization into the fluorine gas bubbles, as illustrated in Reaction 5 below.

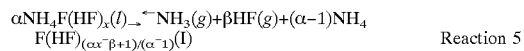  Reaction 5 wherein $\beta$ is the HF to $NH_3$ ratio that is transferred from the $NH_4F(HF)_x$ melt to the $F_2$ bubble.

The major competing reaction, Reaction 6 below, produces $N_2$ rather than $NF_3$.

$3c_2F_2(g)+2c_2NH_3(g) \rightarrow c_2N_2(g)+6c_2HF(g)$  Reaction 6 wherein $c_2$ is the fraction of the $F_2$ feed that reacts to produce $N_2$.

Alternatively, $F_2$ could pass through the $NF_3$ reactor without reacting as shown below in Reaction 7.

$c_3F_2(g) \rightarrow c_3F_2(g)$  Reaction 7 wherein $c_3$ is the fraction of the $F_2$ feed that passes through the reactor without reacting. Reactions 4 to 7 describe essentially all the fluorine reactions ($c_1+c_2+c_3=1$).

The HF by-product may be removed from the $NH_4F(HF)_x$ melt by vaporization via Reaction 8.

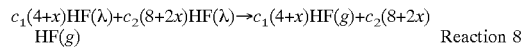  Reaction 8

The present invention utilizes mechanical energy derived from a heat engine to eliminate or greatly reduce the need for mechanical energy from turbines or stirrers in the $NF_3$ reactor to achieve high $F_2$-to-$NF_3$ conversions ($c_1$ in Reaction 4). A brief description of the Carnot cycle, a well-known heat engine, serves to illustrate the underlying principles of the invention (See Walter J. Moore, Physical Chemistry, Third Edition (1962), Prentice-Hall, p. 70). Heat and energy transfer occurs between the heat engine system and its environment. The Carnot cycle uses a gas working fluid system to partially convert heat transferred from a higher temperature reservoir in its environment to a separate lower temperature reservoir in its environment in order to transfer the maximum mechanical energy from the working fluid system to its environment. In this context, a working fluid is any material that undergoes a series of cyclic transformations, physical and/or chemical. The Carnot cycle can be described in terms of four steps. In the first step, heat is withdrawn from a high temperature reservoir by isothermal reversible expansion of the gas working fluid, which also transfers mechanical energy to the environment. Next, an adiabatic reversible expansion of gas transfers mechanical energy to the environment and cools the gas. Then, work from the environment results in isothermal (heat to the lower temperature reservoir) reversible compression of the system. Finally, an adiabatic reversible compression returns the gas working fluid to its original temperature and pressure state. The net outcome of this process is maximum net mechanical energy is transferred from the system to its environment based the transfer of heat from a high temperature reservoir in the environment to a low temperature reservoir in the environment.

The present invention uses a heat engine to produce mechanical energy within the $NF_3$ reactor to establish the desired flow patterns within the reactor and intimately mix the $F_2$ and $NH_4F(HF)_x$ reactants to efficiently produce $NF_3$. Preferably, the heat of reaction is used as the thermal energy source needed for the heat engine. In a preferred embodiment, the invention uses two working fluids [HF and $NH_4F(HF)_x$] in interlocking cycles to produce mechanical work for mixing and fluid flow within the $NF_3$ reactor. The preferred working fluids were selected because $NH_4F(HF)_x$ is a reactant for $NF_3$ production and HF is a product of $NF_3$ production and can help control $NH_3$ vaporization (Reaction 5). Although the remainder of the invention description refers to the exemplary working fluids [HF and $NH_4F(HF)_x$], other working fluids could be used without departing from the present invention. As used herein, "working fluid" refers to any fluid capable of undergoing the cyclic compression and expansion steps of the heat engine cycle without interfering with the reaction of gaseous fluoride and liquid ammonium acid fluoride. The working fluid should also be readily separable from the $NF_3$ reaction product. For example, other hydrogen halides, such as hydrogen chloride, could be used.

FIG. 1 provides a qualitative HF pressure-specific volume diagram illustrating the various steps of the heat engine utilized in the present shown, the interlocking cycles for the HF and $NH_4F(HF)_x$ working fluids comprise transporting a hydrogen fluoride liquid working fluid 11 from a relatively low pressure zone 1 to a relatively high pressure zone 2. The higher pressure HF working fluid 12 is then heated and vaporized within the high pressure zone 2 to produce a moderate velocity, high pressure hydrogen fluoride vapor working fluid 4. The gaseous HF working fluid 4 is allowed to expand to produce a higher velocity, intermediate pressure hydrogen fluoride vapor working fluid jet 5. The HF vapor jet 5 is contacted with gaseous fluorine reactant, $NH_4F(HF)_x$ melt reactant, or any mixture thereof, to form a high velocity, intermediate pressure jet 9. The mechanical energy, in the form of kinetic energy, transferred from vapor jet 9 to the reactor intimately mixes and disperses the gaseous fluorine reactant into the $NH_4F(HF)_x$ melt reactant in an intermediate pressure reaction zone within the reactor. As used herein, the term "vapor jet" refers to a high velocity vapor stream, such as a vapor stream forced out of a small diameter opening or nozzle. As would be understood, kinetic energy is the energy possessed by a body because of its motion. As the HF vapor working fluid travels through the reaction zone in the reactor, the pressure decreases as shown in FIG. 1. The desired gaseous reaction product, $NF_3$, and the HF vapor working fluid 23 are transported from the reaction zone and separated into a gaseous $NF_3$ product stream and a liquid HF working fluid stream 11 that can be recycled for reuse in the heat engine as the cycle begins anew.

FIGS. 2 and 3 are process flow diagrams illustrating two embodiments of the present invention. In the description of the two embodiments shown in FIGS. 2 and 3, reference will be made to the various working fluid states denoted in FIG. 1 and discussed above. The description of the cyclic process will begin with the relatively low pressure hydrogen fluoride liquid working fluid 11 in FIGS. 2 and 3. Typically, the pressure of the low pressure working fluid 11 is about 15 to about 250 kPa. A pressurizing device 13 is used to increase the pressure of the hydrogen fluoride liquid working fluid from the low pressure zone 1 to the higher pressure zone 2. The pressurizing device 13 may be a pump, such as a positive displacement pump, a heated pressure vessel, or a gas pressurized vessel. The high pressure zone 2 pressure is typically between about 250 and 1600 kPa. The preferred highest pressure ($P_2$) is primarily a function of the high pressure hydrogen fluoride vapor working fluid 4 temperature ($T_4$). Equation 1 provides a useful estimation of the preferred high pressure.

$$P_2 = 1.5 \times 10^8 e^{-4300/T_4} \qquad \text{Equation 1}$$

wherein $P_2$ is the pressure of high pressure zone 2, in kPa, and $T_4$ is the temperature, in $°$ K, of the high pressure hydrogen fluoride vapor working fluid 4.

Within the high pressure zone 2, the high pressure hydrogen fluoride liquid working fluid 12 is heated to form high pressure vapor working fluid 4. The vaporization may be accomplished using a heat source 19 that is external to the $NF_3$ reactor 20, as shown in FIG. 2. Alternatively, the energy required for vaporization can be derived from the thermal energy generated within the $NF_3$ reactor 20 via Reactions 3, 4, and 6. The use of thermal energy generated in the reactor 20 is illustrated in FIGS. 2 and 3 as heat exchanger 18. As would be understood, the design and size of the heat exchanger 18 will be determined by the energy required to form the vapor working fluid 4. The heat exchanger 18 may be located within the reactor 20, as shown in FIG. 3, or outside of the reactor, as shown in FIG. 2. As would be understood, the working fluid may be vaporized using a combination of internal and external heat sources.

The $NF_3$ reactor 20 preferably operates substantially isothermally. The $NF_3$ reactor 20 can operate satisfactorily over a temperature range of about 100 to about 200° C., more preferably between about 120 and about 190° C., most preferably between about 130 and about 180° C. The primary incentive to increase the reactor temperature is to increase the hydrogen fluoride vapor working fluid 4 pressure ($P_2$) to increase the hydrogen fluoride vapor working fluid molar thermal and pressure energy. The primary incentive to limit the reactor temperature is corrosion considerations. The $NF_3$ reactor heating and cooling jacket 35 is used to control the $NH_4F(HF)_x$ melt 7 temperature.

Following vaporization, the hydrogen fluoride working fluid 4 passes through a high pressure nozzle 16, which converts a substantial portion of the pressure and thermal energy of the hydrogen fluoride vapor working fluid 4 into a high velocity hydrogen fluoride working fluid vapor jet 5. As used herein, the term "nozzle" refers to any device comprising an orifice capable of producing a vapor jet as a working fluid vapor passes therethrough. As would be understood, standard design procedures can be used to design the high pressure nozzle 16 (See Robert Perry and Cecil Chilton (editors), Chemical Engineers' Handbook, Fifth Edition, McGraw Hill Book (New York), page 5–29). The hydrogen fluoride working fluid vapor jet 5 can be initially contacted with either the $NH_4F(HF)_x$ melt reactant 7 as shown in FIG. 2 or the gaseous fluorine reactant 6 as shown in FIG. 3. Alternatively, one could simultaneously contact the hydrogen fluoride working fluid vapor jet 5 simultaneously with the gaseous fluorine reactant 6 and the $NH_4F(HF)_x$ melt reactant 7. Optionally, an intermediate pressure nozzle 17 further defines the vapor jet downstream of the high pressure nozzle 16. The feed point of the fluorine feed stream 6 is preferably located proximate to the high pressure nozzle 16 or the intermediate pressure nozzle 17.

The molar ratio of the hydrogen fluoride working fluid vapor jet 5 to the gaseous fluorine reactant 6 is preferably greater than about 1:1, more preferably greater than about 3:1, most preferably greater than about 5:1. The molar ratio of the $NH_4F(HF)_x$ melt reactant 7 to the gaseous fluorine reactant 6 is preferably greater than about 2,000:1, more preferably greater than about 5,000:1, most preferably greater than about 10,000:1 in order to adequately contact the gaseous fluorine reactant 6 and the $NH_4F(HF)_x$ melt reactant 7 and maintain an essentially constant $NH_4F(HF)_x$ melt acidity x value and temperature. The gaseous fluorine reactant stream 6 may contain other gaseous components in addition to elemental fluorine. For example, hydrogen fluoride may be periodically added to the fluorine feed stream 6 in order to remove blockages that may develop in the feed line.

The $NH_4F(HF)_x$ melt reactant 7 $NH_4F(HF)_x$ melt acidity x value is preferably between about 1.2 and about 2.4, more preferably between about 1.4 and about 2.2, and most preferably between about 1.6 and about 2.0. The $NH_4F(HF)_x$ melt reactant 7 temperature is preferably between about 100 and about 200° C., more preferably between about 120 and about 190° C. and most preferably between about 130 and about 180° C. The $NH_4F(HF)_x$ melt reactant 7 pressure is preferably between about 50 and about 400 kPa, more preferably between about 75 and about 200 kPa, and most preferably between about 100 and about 200 kPa.

After passing through the high pressure nozzle 16, and optionally the intermediate pressure nozzle 17, and contacting one or more of the $NF_3$ reactants, a vapor jet 9 is formed. The vapor jet 9 enters an intense mixing zone 22 downstream of the high pressure nozzle 16. Mechanical energy transferred from the high velocity vapor jet 9 creates a turbulent mixing zone 22, resulting in intimate mixing of the gaseous fluorine 6 and the liquid ammonium acid fluoride 7. A fine dispersion of the gaseous fluorine reactant 6 within the $NH_4F(HF)_x$ melt reactant 7 is formed. The hydrogen fluoride vapor working fluid and the intimate mixture of fluorine and ammonium acid fluoride flow into a reaction zone 10 in fluid communication with the mixing zone 22. The reaction zone 10 should provide sufficient residence time between the mixing zone 22 and the $NF_3$ reactor vapor-liquid interface 23 for the small dispersed gaseous fluorine reactant bubbles to react with the $NH_4F(HF)_x$ melt reactant to produce nitrogen trifluoride. Although not shown, modest mechanical power inputs from a stirrer or turbine could be used to supplement the mixing intensity provided by the working fluid vapor jet 9.

The flow regime in the reaction zone 10 may be up-flow as illustrated in FIG. 2 or down-flow and then up-flow as illustrated on FIG. 3. Sufficient residence time for intimate contact of the two reactants should be provided in the reaction zone in order to substantially complete $F_2$-to-$NF_3$ conversion. The space time or residence time in the reaction zone 10 is preferably greater than 0.5 seconds, more preferably greater than 2 seconds, most preferably greater than 3 seconds. Space time is the ratio of the reaction zone 10 volume to the sum of the volumetric flow rates of the gaseous fluorine reactant 6 and the $NH_4F(HF)_x$ melt reactant 7. The distance between the high pressure nozzle 16 and the vapor-liquid interface 23 is preferably greater than about 0.5 meters, more preferably greater than about 2 meters, and most preferably greater than about 3 meters.

Equation 2 provides general guidance on the relationship between the $NH_4F(HF)_x$ liquid temperature (t, °C.) $NH_4F(HF)_x$ melt acidity x value, and the HF partial pressure (P, kPa) (See D. Filliaudeau & G Picard, "Temperature dependence of the vapor pressure and electrochemical windows of the $NH_4FH_2$-HF mixtures," *Material Science Forum*. Vol. 73–75, p.669–676 (1991)).

$$P = \left[\frac{101.325}{760}\right] 10^{\frac{[\frac{x-1}{x}]-0.5559+6.642\times10^{-3}t}{0.1620+1.147\times10^{-3}t}} \qquad \text{Equation 2}$$

The HF partial pressure at the $NF_3$ reactor vapor-liquid interface 23 is preferably between about 5 and about 240 kPa, more preferably between about 10 and about 170 kPa, and most preferably between about 20 and about 115 kPa. Flow communication is established between the $NF_3$ reactor vapor-liquid interface 23 and the high pressure nozzle 16 or intermediate pressure nozzle 17 for the $NH_4F(HF)_x$ melt reactant 7 using the walls of the $NF_3$ reactor partition 25 as shown in FIG. 3, or between the wall of the $NF_3$ reactor partition 25 and the $NF_3$ reactor 20 wall as shown in FIG. 2, or using an external $NH_4F(HF)_x$ reactant recycle line 26 as shown in FIG. 2.

An $NH_3$ feed 30 is advantageously added to the vapor space above the $NF_3$ reactor vapor-liquid interface 23 or to the recycle $NH_4F(HF)_x$ melt reactant 7 between the $NF_3$ reactor vapor-liquid interface 23 and the high pressure nozzle 16 or the intermediate pressure nozzle 17. The ammonia feed rate is set to maintain the desired ammonium acid fluoride 7 inventory in the reactor 20. One could alternatively replace the ammonia feed line 30 with an ammonium acid fluoride feed line to maintain the desired ammonium acid fluoride inventory in the reactor 20.

The $NF_3$ reactor 20 produces a liquid $NH_4F(HF)_x$ by-product 29 steam and a $NF_3$ reactor vapor product 27. The primary function of the $NH_4F(HF)_x$ by-product 29 stream is to control the $NH_4F(HF)_x$ melt reactant metals content, i.e., the $NH_4M_YF_Z(HF)_x$ y value. Nickel is generally the most problematic metallic impurity. The nickel content is preferably keep less than about 2 wt. % of the $NH_4M_YF_Z(HF)_x$ melt, more preferably less than about 1 wt. % of the $NH_4M_YF_Z(HF)_x$ melt, most preferably less than about 0.6 wt. %.

The $NF_3$ reactor vapor product 27, which comprises $NF_3$ and the HF vapor working fluid, is advantageously treated in a conventional demister 31 that is equipped with impingement baffles 32 that coalescence the entrained $NH_4F(HF)_x$, so that it can be recycled to the $NF_3$ reactor 20 via the $NF_3$ reactor vapor product 27 line. The substantially $NH_4F(HF)_x$-free $NF_3$ reactor vapor product 33 is treated by the HF recovery unit 34 to produce low pressure hydrogen fluoride liquid working fluid 11, the HF by-product stream 24 and a substantially HF-free crude $NF_3$ product 15. The HF recovery unit typically comprises a low temperature flash to remove most of the HF from the substantially $NH_4F(HF)_x$-free $NF_3$ reactor vapor product 33. The overhead product from the low temperature flash is preferably fed to a conventional sodium fluoride HF trap to remove essentially all remaining HF. An optional and conventional crude $NF_3$ recycle blower 37 can be used to adjust the pressure at the $NF_3$ reactor vapor-liquid interface 23 and direct a crude $NF_3$ recycle stream 36 to the lower pressure HF stripping zone 14 of the $NF_3$ reactor 20 to control the flow rates of the HF by-product stream 24 and the low pressure hydrogen fluoride liquid working fluid 11, and ultimately the $NH_4F(HF)_x$ melt acidity x value. A sparge ring 38 may advantageously used to distribute the crude $NF_3$ recycle stream 36, as shown in FIG. 3.

The following example is given to illustrate the invention, but should not be considered in limitation of the invention.

EXAMPLE

This example uses the reactor configuration similar to the reactor configuration in FIG. 3. The $NF_3$ reactor is constructed using a 4 meter long, 12 inch diameter schedule 40 monel pipe with flanged top and cap end bottom. Helical steam heating and water-cooling coils are attached to the outside of the reactor using heat transfer cement. The $NF_3$ reactor partition is a concentric 3.3 meter long schedule 10 monel pipe with 20 centimeter clearance between the bottom of the $NF_3$ reactor wall and the bottom of the $NF_3$ reactor partition wall. The reactor is fitted with a seal leg overflow for the $NH_4F(HF)_x$, by-product stream at 0.5 meters below the top flange. A nitrogen stripping gas distribution ring is placed 3 meters from the top flange center in the annulus roughly equally spaced between the $NF_3$ reactor wall and the $NF_3$ reactor partition. The primary function of the nitrogen stripping gas is to establish uniform temperatures and reasonable $NH_4F(HF)_x$, circulation rates.

A pressure vessel with the head space pressurized with nitrogen is used to provide the high pressure liquid hydrogen fluoride feed. A 0.5 inch monel pipe, along the $NF_3$ reactor partition axis, packed with monel gauze is used to vaporize the HF feed to a 2 mm high pressure nozzle. The $NH_4F(HF)_x$ melt acidity x value is controlled by feeding gaseous ammonia into the $NH_4F(HF)_x$ melt. Fluorine is fed into a one-centimeter diameter, 3-centimeter long cavity between the highest pressure nozzle with a 5 mm intermediate pressure nozzle. The intermediate pressure nozzle outlet is positioned about 3.5 meters from the top flange, along the axis of the $NF_3$ reactor partition. First, the $NF_3$ reactor is heated to the desired temperature with a stripping nitrogen rate equivalent to the fluorine feed rate. Then, the HF tank is pressurized to the desired pressure and ammonia is fed to maintain the desired $NH_4F(HF)_x$ melt acidity x value. Finally, the fluorine feed is progressively increased with equivalent molar decrease in the stripping nitrogen feed rate. With a fluorine feed rate of sixty grams per minute, no stripping nitrogen feed rate, 5 bar HF feed pressure, 150° C., and 1.8 $NH_4F(HF)_x$ melt acidity x value, the crude $NF_3$ product contains about 76 vol. % $NF_3$, 9 vol. % $N_2$, and 14 vol. % fluorine on an HF-free basis, which is equivalent to a $c_1$ value of about 0.85.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of producing nitrogen trifluoride, comprising:
   providing a reactor comprising a mixing zone and a reaction zone in fluid communication with the mixing zone;
   feeding gaseous fluorine into the mixing zone of the reactor;
   feeding liquid ammonium acid fluoride into the mixing zone of the reactor;
   feeding a working fluid vapor jet into the mixing zone of the reactor, wherein the working fluid vapor jet transfers kinetic energy into the mixing zone, the kinetic energy dispersing the gaseous fluorine within the liquid ammonium acid fluoride;
   reacting the liquid ammonium acid fluoride with the fluorine dispersed therein to produce nitrogen trifluoride as the liquid ammonium acid fluoride and fluorine pass through the reaction zone in the reactor; and
   removing a gaseous reaction product stream from the reactor, the reaction product stream comprising nitrogen trifluoride and the working fluid vapor.

2. The method of claim 1, wherein the working fluid is a hydrogen halide.

3. The method of claim 1, wherein the working fluid is hydrogen fluoride.

4. The method of claim 1, wherein the ammonium acid fluoride has an acid-base stoichiometry of $NH_4M_yF_z(HF)_x$, wherein M is a metal selected from the group consisting of Group IA through VA, Group IB through VIIB and Group VIII of the Periodic Table of Elements and mixtures thereof; y is 0–12; z is 1–12; and x is the melt acidity value.

5. The method of claim 1, wherein the ammonium acid fluoride has an acid-base stoichiometry of $NH_4F(HF)_x$, wherein x is the melt acidity value.

6. The method of claim 5, wherein the melt acidity value of the liquid ammonium acid fluoride is about 1.2 to about 2.4.

7. The method of claim 6, wherein the melt acidity value of the liquid ammonium acid fluoride is about 1.4 to about 2.2.

8. The method of claim 1, wherein the liquid ammonium acid fluoride has a temperature of about 100 to about 200° C.

9. The method of claim 8, wherein the liquid ammonium acid fluoride has a temperature of about 130 to about 180° C.

10. The method of claim 1, wherein the liquid ammonium acid fluoride has a pressure of about 50 to about 400 kPa.

11. The method of claim 10, wherein the liquid ammonium acid fluoride has a pressure of about 100 to about 200 kPa.

12. The method of claim 1, wherein the ratio of the reaction zone volume to the sum of the volumetric flow rates of the gaseous fluorine and the liquid ammonium acid fluoride is at least about 0.5 seconds.

13. The method of claim 12, wherein the ratio of the reaction zone volume to the sum of the volumetric flow rates of the gaseous fluorine and the liquid ammonium acid fluoride is at least about 2.0 seconds.

14. The method of claim 1, wherein the molar ratio of the working fluid vapor jet to the gaseous fluorine is greater than about 1:1.

15. The method of claim 14, wherein the molar ratio of the working fluid vapor jet to the gaseous fluorine is greater than about 5:1.

16. The method of claim 1, wherein the molar ratio of the liquid ammonium acid fluoride to the gaseous fluorine is greater than about 2,000:1.

17. The method of claim 16, wherein the molar ratio of the liquid ammonium acid fluoride to the gaseous fluorine is greater than about 10,000:1.

18. The method of claim 1, further comprising separating the gaseous reaction product stream into a gaseous nitrogen trifluoride product stream and a liquid working fluid stream.

19. The method of claim 18, further comprising:
   pressurizing the liquid working fluid stream to a pressure of about 250 to about 1600 kPa;
   vaporizing the pressurized liquid working fluid stream to form a working fluid vapor; and
   feeding the working fluid vapor through a nozzle to form the working fluid vapor jet.

20. The method of claim 19, wherein said vaporizing step comprises heating the pressurized liquid working fluid stream with the heat of reaction generated in the reaction zone of the reactor.

21. A method of producing nitrogen trifluoride, comprising:

provide a reactor comprising a mixing zone and a reaction zone in fluid communication with the mixing zone;

feeding gaseous fluorine into the mixing zone of the reactor;

feeding liquid ammonium acid fluoride into the mixing zone of the reactor, the ammonium acid fluoride has an acid-base stoichiometry of $NH_4F(HF)_x$, wherein x is the melt acidity value, the melt acidity value being about 1.2 to about 2.4;

feeding a hydrogen fluoride vapor jet into the mixing zone of the reactor, wherein the working fluid vapor jet transfers kinetic energy into the mixing zone, the kinetic energy dispersing the gaseous fluorine within the liquid ammonium acid fluoride;

reacting the liquid ammonium acid fluoride with the fluorine dispersed therein to produce nitrogen trifluoride as the liquid ammonium acid fluoride and fluorine pass through the reaction zone in the reactor; and removing a gaseous reaction product stream from the reactor, the reaction product stream comprising nitrogen trifluoride and the hydrogen fluoride vapor, wherein the molar ratio of the hydrogen fluoride vapor jet to the gaseous fluorine is greater than about 3:1 and the molar ratio of the liquid ammonium acid fluoride to the gaseous fluorine is greater than about 5,000:1.

22. The method of claim 21, further comprising separating the gaseous reaction product stream into a gaseous nitrogen trifluoride product stream and a liquid hydrogen fluoride stream.

23. The method of claim 22, further comprising:

pressurizing the liquid hydrogen fluoride stream to a pressure of about 250 to about 1600 kPa;

vaporizing the pressurized liquid hydrogen fluoride stream to form a hydrogen fluoride vapor; and feeding the hydrogen fluoride vapor through a nozzle to form the hydrogen fluoride vapor jet.

24. The method of claim 23, wherein said vaporizing step comprises heating the pressurized liquid hydrogen fluoride stream with the heat of reaction generated in the reaction zone of the reactor.

* * * * *